Jan. 6. 1925.

J. HARRIS

ELECTRICITY METER

Original Filed July 2, 1923

1,521,766

Inventor:
Jesse Harris
By L. L. Cragg Atty.

Patented Jan. 6, 1925.

1,521,766

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

ELECTRICITY METER.

Application filed July 2, 1923. Serial No. 649,067. Renewed May 31, 1924.

*To all whom it may concern:*

Be it known that I, JESSE HARRIS, citizen of the United States, residing at La Fayette, in the county of Tippecanoe and State of Indiana, have invented a certain new and useful Improvement in Electricity Meters, of which the following is a full, clear, concise, and exact description.

My invention relates to electricity meters and particularly to watt meters which employ motor elements and motion damping magnets that operate in conjunction with motion damping armatures upon the moving elements of the meters, though the invention is not to be thus restricted.

The invention resides in means for offsetting or compensating for the effects arising in these magnetic motion damping devices due to changes in temperature. In meters as at present constructed the braking action of the damping magnets is weakened as the temperature rises, permitting the meter to operate more rapidly per unit of load or energy. Conversely, the braking action of the damping magnet is increased as the temperature is lowered causing the meter to operate more slowly per unit of load or energy. Hitherto watt meters have been calibrated to operate as perfectly as possible at a normal or mean temperature but error was introduced by a change in temperature with the result that either the customer would be charged too much for current if the temperature were increased from the selected mean or too little if the temperature were decreased from the selected mean.

I employ a device for varying the amount of flux passing from the damping magnet to the damping armature, this device being responsive to changes in temperature automatically to compensate for the effects thereof upon the motion damping system. In the preferred embodiment of the invention, this device is in the form of a movable magnetic flux diverter arranged to regulate the magnitude of the flux passing to the armature in accordance with temperature changes.

Figure 1:
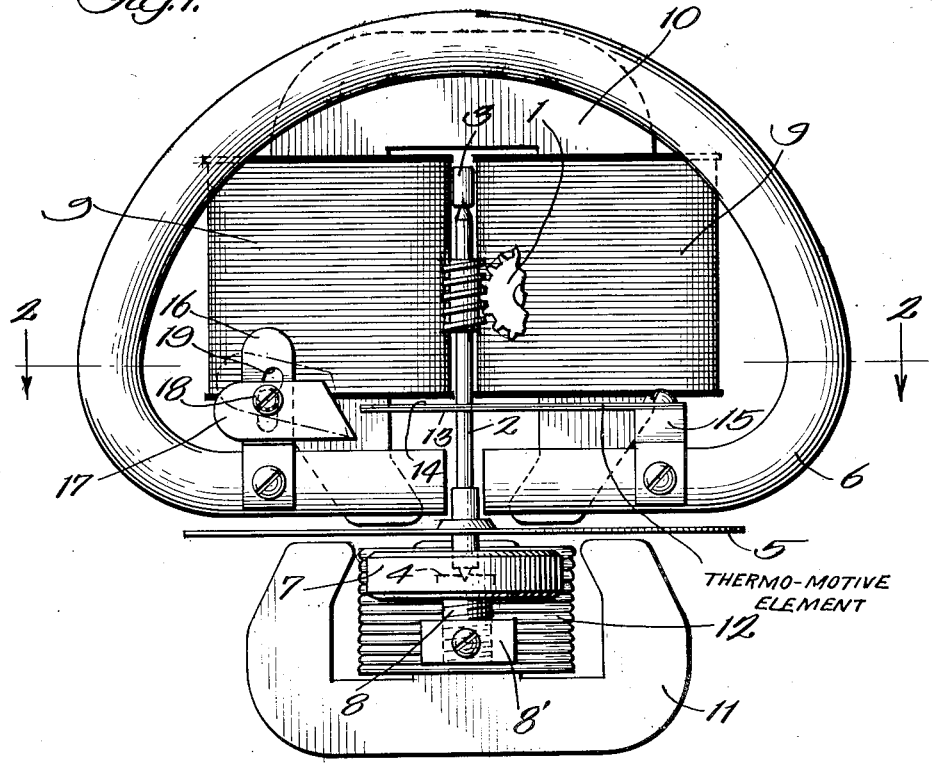
Figure 2:
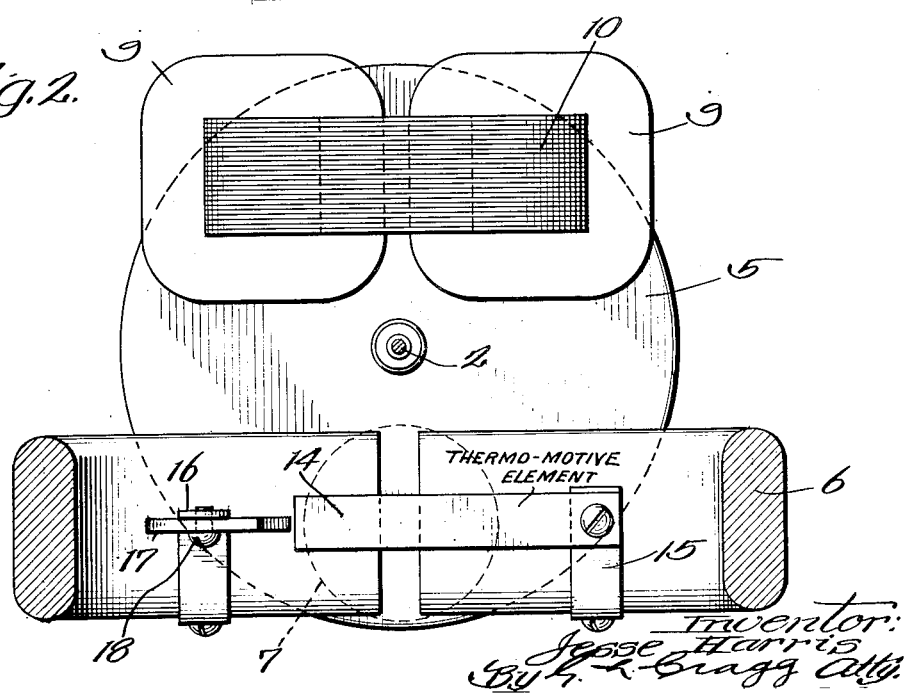

The invention will be more fully explained in connection with the accompanying drawing in which Fig. 1 is a front elevation of a watt hour alternating current electricity meter equipped with a device of my invention and Fig. 2 is a sectional view on line 2—2 of Fig. 1.

Like parts are indicated by similar characters of reference in both figures.

The meter illustrated is a single phase alternating current watt hour meter but it is obvious that the invention may be also used in connection with direct current meters and may be applied to watt meters of the indicating and recording type.

The meter illustrated includes any suitable indicating or revolution counting mechanism 1 which is operated by the upright meter shaft or spindle 2 suitably supported at its ends in bearings 3, 4. Said spindle carries an armature in the form of a disc 5 of aluminum or other suitable non-magnetic metal. This disc may serve as an armature to constitute a part of the motive element of the meter and also preferably serves as an element of a damping device which turns in a magnetic field furnished by a damping permanent magnet 6. The damping magnet shown is disposed with its poles upon the top side of the disc armature. An iron keeper 7 is disposed on the other side of the disc armature and opposite the magnetic poles, this disc being traversed by the flux passing between the poles of the magnet and serving to define a path for this flux which traverses the disc transversely thereto. The keeper 7 is upon a rod 8 threaded into support 8' whereby it may be moved toward and from the disc in calibrating. The armature 5 is preferably also the armature of the motor member of the meter, being subject to magnetic flux from the potential winding 9 passing therethrough from the poles of the U-shaped magnet core 10 that is perpendicular to and on one side of the armature disc 5. An E-shaped core 11 is perpendicular to and upon the other side of the armature disc. The middle leg of core 11 is wound with a current winding or coil 12 included in a main of the system and co-operating with the meter armature and the potential element to produce torque proportional to the wattage.

The magnetic flux diverter illustrated includes a thermostatic or thermo-motive member comprising a magnetic, iron, strip 13 and another metal strip 14 such as a nickel steel alloy having a coefficient of expansion differing from that of the magnetic strip. The thermostatic member is mounted at one end upon an iron bracket 15 which is carried upon one of the polar portions of the magnet 6, the iron element 13 being preferably in contact with the bracket to be included thereby in a magnetic circuit relation with the magnet. Another iron bracket 16 is mounted upon the other polar portion of the magnet and carries an iron pole piece 17 which is in screw and slot connection 18, 19 with the bracket 16 in order that the angularity of the pole piece 17 may be adjusted. The elements 13, 15, 16 and 17 constitute a shunt for a portion of the flux that would otherwise pass between the poles of the magnet 6. The thermostatic or thermo-motive member is flexed toward the magnet as the temperature is lowered to shunt flux from the damping disc 5 to compensate for the effect of the decreased temperature upon the damping system. The thermostatic element is flexed away from the damping magnet as the temperature rises to increase the flux flowing through the damping disc to compensate for the effects due to rise in temperature. It will be obvious that the damping magnet is permitted to exert attractive effort upon the thermo-motive member, this attractive effort being assisted or opposed according to temperature, the position of the thermo-motive member being jointly determined by the attractive effort of the magnet thereon and by the effect due to the existing temperature. The face of the pole piece 17 opposes the free end of the thermostatic element and is desirably sloped or tapered in a manner to procure exactly the desired change in the amount of flux traversing the shunt about the poles of the magnet thereby to regulate the amount of flux traversing the damping disc. By the construction illustrated more or less of the magnetic flux is shunted away from the disc dependent upon the extent of temperature change whereby the damping effect upon the disc is changed to annul the errors that would otherwise be due to change of temperature.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. An electricity meter inclusive of a motor and a motion damping magnet; a motion damping armature upon the moving element of the motor of the meter and positioned with respect to said magnet to receive magnetic flux therefrom; a moving magnetic flux diverter, in the form of a thermostatic member comprising an iron strip and another strip having a different coefficient of expansion from that of the iron strip, related to the magnet to divert flux of the magnet from the armature, said thermostatic member being mounted upon one polar portion of the damping magnet; and an iron element mounted upon the other polar portion of the damping magnet and opposing one end of the thermostatic member which is free, said iron element being shaped to co-operate with the magnetic part of the thermostatic member to regulate the degree of flux traversing the armature according to temperature changes.

2. An electricity meter inclusive of a motor; a motion damping disc armature upon the moving element of the motor of the meter; a damping magnet disposed with its poles upon one side of the disc armature; a keeper on the other side of said disc armature and opposite the magnet poles to be traversed by the flux of the magnet; a movable magnetic flux diverter, in the form of a thermostatic member comprising an iron strip and another strip having a different co-efficient of expansion from that of the iron strip, positioned to divert flux passing between the poles of the magnet, said thermostatic member being mounted upon one polar portion of the damping magnet; and an iron element mounted upon the other polar portion of the damping magnet and opposing one end of the thermostatic member which is free, said iron element being shaped to co-operate with the magnetic part of the thermostatic member to regulate the degree of flux traversing the armature according to temperature changes.

3. An electricity meter inclusive of a motor; a motion damping magnet; a motion damping armature upon the moving element of the motor and positioned with respect to said magnet to receive magnetic flux therefrom; and a thermo-motive member inclusive of magnetic material positioned to divert flux of the magnet from the armature and also inclusive of material responsive to temperature changes, the position of said thermo-motive member being jointly determined by the attractive effort of the magnet thereon and by the effect of the temperature.

In witness whereof, I hereunto subscribe my name this 15th day of June, A. D. 1923.

JESSE HARRIS.